Patented Sept. 11, 1934

1,973,635

UNITED STATES PATENT OFFICE 1,973,635

MANUFACTURE OF AZO-DYESTUFFS CONTAINING SULPHUR

Robert Lantz, Paris, France, assignor of one-half to Societe Anonyme Des Matieres Colorantes & Produits Chimiques de Saint-Denis, Paris, France No Drawing. Application June 11, 1931, Serial No. 543,746. In France June 19, 1930

13 Claims. (Cl. 260—77)

Müller (Zeitschrift für Farben-Industrie vol. 5, 1906, p. 307) has described a dyestuff made by coupling tetrazotized para-dithioaniline (4,4'-diaminodiphenyldisulphide) whose structural formula is:

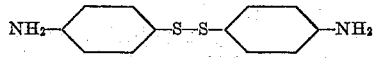

with β-naphthylamine; he has indicated that this dyestuff is insufficiently soluble in a solution of sodium sulphide and is therefore without interest in dyeing in sodium sulphide baths.

This invention is based on the observation that the dyestuffs, which are obtained by coupling the aforesaid tetrazotized amine with other azo-components, have for the most part a good solubility in sodium sulphide solutions and are capable of dyeing in sodium sulphide baths. In particular it is surprising that the dyestuff from α-naphthylamine whose structural formula is:

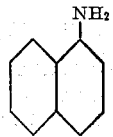

which is isomeric with that described by Müller (loc. cit.) has a good solubility in sodium sulphide solution.

There may be used as the azo-component a body which itself contains a disulphide group, such as bis-(2 hydroxy-naphthyl 6)-disulphide whose structural formula is:

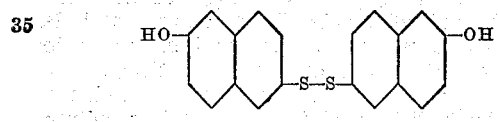

(Zincke et Dereser Ber. d. d. Chem. Ges., vol. 51, 1918, p. 357) or the dithioanilide of β-hydroxynaphthoic acid whose structural formula is:

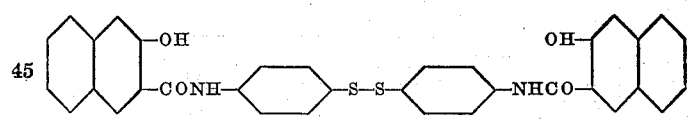

(obtainable in the manner hereinafter described), or a body containing a trisulphide group, such as the trisulphide of α-naphthol whose structural formula is not known obtainable as described by Watson and Dutt (Journ. Chem. Soc. vol. 121, p. 2418-9).

The following examples illustrate the invention, the parts being by weight:

Example 1

12.4 parts of para-dithioaniline, which may be prepared, for example, as described by Louchart (Journ. für prakt. Chemie vol. 41, new series, 1890, p. 200), are dissolved in 36 parts of hydrochloric acid of 22° Bé. and 300 parts of water. To the solution so obtained there are added at ordinary temperature 70 parts of a solution of sodium nitrite of 10 per cent. strength until the nitrite is in slight excess. The whole is then introduced into a solution prepared by dissolving 14.4 parts of β-naphthol whose structural formula is:

in 112 parts of a caustic soda solution of 36° Bé. and 500 parts of water. The dyestuff separates immediately in the form of a vivid red precipitate, which is removed by filtration and dried.

Other dyestuffs may be obtained in an analogous manner if there is used instead of β-naphthol an equimolecular quantity of α-naphthol whose structural formula is:

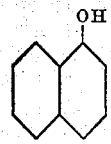

methylphenylpyrazolone whose structural formula is:

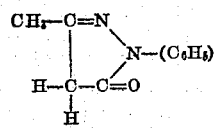

2,7-dihydroxynaphthalene whose structural formula is:

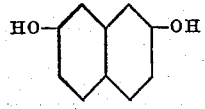

or the like.

Example 2

Dithioaniline is tetrazotized in the manner described in Example 1 and the excess of nitrous acid is destroyed by the addition of a small quantity of a solution of dithioaniline in hydrochloric acid. The tetrazo solution is then introduced into an aqueous solution of the sulphate of metaphenylenediamine whose structural formula is:

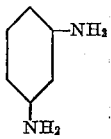

corresponding with 10.8 parts of the base, whereupon the dyestuff separates. 100 parts of a solution of sodium acetate of 30 per cent. strength are added, the whole is allowed to stand for several hours and the dyestuff is then separated by filtration. When dry it is a black powder having the properties hereinafter described.

Tetrazotized dithioaniline may be coupled with α-naphthylamine in like manner.

Example 3

A tetrazo solution prepared from dithioaniline as described in Example 1 is introduced into 300 parts of an aqueous alcoholic (50 per cent.) solution containing 70 parts of caustic soda solution of 40° Bé. and 32 parts of β-hydroxynaphthoic acid dithioanilide. The dyestuff separates in the form of a dark red precipitate. It is freely soluble in sodium sulphide solution.

β-hydroxynaphthoic acid dithioanilide may be made in the following manner:

A suspension of 7 parts of β-hydroxynaphthoic acid and 5 parts of 4,4'-dithioaniline in anhydrous toluene is heated to 60-70° C. 3 parts of phosphorus trichloride are then added in small quantities, care being taken to stir the reaction mixture, whereupon the whole is heated to boiling whilst stirring is continued. When hydrogen chloride is no longer evolved the whole is rendered alkaline by the addition of sodium carbonate and the toluene is removed by distillation with steam. On acidification β-hydroxynaphthoic acid dithioanilide is precipitated. It is sparingly soluble in alcohol and boiling acetic acid but is soluble in caustic soda solution and in sodium carbonate solution at a raised temperature.

Tetrazotized dithioaniline may be coupled with bis-(2 hydroxynaphthyl 6)-disulphide and with the trisulphide of α-naphthol in a manner analogous to that described in Example 1.

The properties of a number of dyestuffs which can be made in accordance with the invention are indicated in the following table:

| Tetrazotized dithioaniline coupled with 2 molecular proportions of the following substances | Color of the dry powder | Color of solution in dilute sodium sulphide solution | Color of solution in sulphuric acid |
|---|---|---|---|
| Methylphenylpyrazolone | Yellow-orange | Yellow | Red. |
| α-naphthol | Black | Violet-red | Blue-purple. |
| β-naphthol | Red | Red | Violet. |
| 2:7-dihydroxynaphthalene | Purple-black | Violet-red | Violet-red. |
| α-naphthylamine | Black | Brown-yellow | Blue-purple. |
| Metaphenylenediamine | do | Greenish-yellow | Bluish-violet. |
| Bis-(2 hydroxynaphthyl 6) disulphide | Reddish-black | Brown-purple | Violet. |
| β-hydroxynaphthoic acid dithioanilide | Dark red | Orange-brown | Violet-blue. |
| Trisulphide of α-naphthol | Reddish-black | Red-purple | Sparingly soluble blue-black. |

What I claim is:

1. A process of manufacturing azo-dyestuffs which comprises coupling tetrazotized 4,4'-aminodiphenyl-disulfide with an unsulphonated azo-component with the exception of β-naphtylamine.

2. A process of manufacturing azo-dyestuffs which comprises coupling tetrazotized 4,4'-diaminodiphenyl-disulphide with an unsulphonated azo component containing an amino group, with the exception of β-naphtylamine.

3. A process of manufacturing azo-dyestuffs which comprises coupling tetrazotized 4,4'-diaminodiphenyl-disulphide with metaphenylediamine.

4. A process of manufacturing azo-dyestuffs which comprises coupling tetrazotized 4,4'-diaminodiphenyl-disulphide with an unsulphonated azo component containing a hydroxy group.

5. A process of manufacturing azo-dyestuffs which comprises coupling tetrazotized 4,4'-diaminodiphenyl-disulphide with an unsulphonated azo-component the molecule of which comprises at least one group $S_n$, $n$ being an integer greater than 1 and smaller than 4.

6. A process of manufacturing azo-dyestuffs which comprises coupling tetrazotized 4,4'-diaminodiphenyl-disulphide with an unsulphonated azo-component the molecule of which comprises the group $S_2$.

7. A process of manufacturing azo-dyestuffs which comprises coupling tetrazotized 4,4'-diaminodiphenyl-disulphide with β-hydroxynaphthoic acid dithioanilide.

8. A process of manufacturing azo-dyestuffs which comprises diazotizing para-dithioaniline, introducing the resulting product in a caustic soda solution containing methylphenylpyrazolone, removing by filtration the dyestuff which precipitates and drying said dyestuff.

9. A process of manufacturing azo-dyestuffs which comprises heating a suspension of 7 parts of β-hydroxynaphthoic acid and 5 parts of 4,4'-dithioaniline in anhydrous toluene to 60-70° C., adding three parts of phosphorus trichlorid, rendering the whole alkaline when hydrogen chloride is no longer evolved by the addition of sodium carbonate, removing toluene by distillation with steam, acidifying so as to cause β-hydroxynaphthoic acid dithioanilide to separate by precipitation and coupling the last mentioned compound with tetrazotized 4,4'-diaminodiphenyldisulphide.

10. As a new compound a dyestuff resulting from the coupling of tetrazotized dithioaniline with two molecular proportions of methylphenylpyrazolone, having a yellow-orange color in the dry state and soluble in dilute sodium sulphide solutions and sulphuric acid solutions so as to give yellow and red solutions, respectively.

11. As a new compound, a dyestuff having a black color in the dry state and soluble in sodium sulphide and sulphuric acid solutions so as to form greenish-yellow and bluish-violet solutions respectively, said dyestuff resulting from the coupling of tetrazotized dithioaniline with two molecular proportions of metaphenylene diamine.

12. As a new compound, a dyestuff having a dark red color in the dry state and soluble in sodium sulphide and sulphuric acid solutions so as to form orange-brown and violet blue solutions respectively, said dyestuff being the product resulting from the coupling of tetrazotized dithioaniline with β-hydroxynaphthoic acid dithioanilide 13. As a new compound, an azo-dyestuff consisting of the coupling product of tetrazotized 4,4'-diaminodiphenyldisulphide with an unsulphonated azo-component with the exception of β-naphthylamine, this dyestuff being soluble in sodium sulphide and sulphuric acid solutions.

ROBERT LANTZ.